US010103600B2

(12) United States Patent
Dugas

(10) Patent No.: US 10,103,600 B2
(45) Date of Patent: Oct. 16, 2018

(54) FLYWHEEL

(71) Applicant: Patrick J. Dugas, Winter Haven, FL (US)

(72) Inventor: Patrick J. Dugas, Winter Haven, FL (US)

(*) Notice: Subject to any disclaimer, the term of this patent is extended or adjusted under 35 U.S.C. 154(b) by 0 days.

(21) Appl. No.: 14/846,677

(22) Filed: Sep. 4, 2015

(65) Prior Publication Data

US 2015/0381012 A1 Dec. 31, 2015
US 2018/0138779 A9 May 17, 2018

Related U.S. Application Data

(63) Continuation-in-part of application No. 13/573,889, filed on Oct. 15, 2012, now abandoned, and a
(Continued)

(51) Int. Cl.
H02K 7/02 (2006.01)
H02K 7/10 (2006.01)
(Continued)

(52) U.S. Cl.
CPC ............ H02K 7/025 (2013.01); H02K 7/108 (2013.01); F16F 15/30 (2013.01); H02K 16/00 (2013.01);
(Continued)

(58) Field of Classification Search
CPC ... Y10T 403/32041; F16F 15/30; H02K 7/02; H02K 7/025; H02K 7/04; H02K 7/116; H02K 27/22; H02K 21/22; H02K 21/222
(Continued)

(56) References Cited

U.S. PATENT DOCUMENTS 1,689,913 A * 10/1928 Carrey ................... F16D 43/18
  192/105 BA
4,262,552 A * 4/1981 Honda ................... F02B 75/06
  192/103 F (Continued)

FOREIGN PATENT DOCUMENTS

WO WO 2008037004 A1 * 4/2008 ............... F03G 3/08

Primary Examiner — Thomas Truong
Assistant Examiner — Robert E Mates
(74) Attorney, Agent, or Firm — Cygnet IP Law, P.A.; Stephen W. Aycock, II

(57) ABSTRACT

A flywheel based energy storage system which can include one or more flywheels and a motor/generator unit is disclosed. The system can include a universal joint connecting a suspended flywheel and motor/generator to another body (e.g., frame or mounting point on another structure). The universal joint permits automatic adjustment of an axis of the suspended flywheel to help reduce effects of gyroscopic precession on the flywheel system. A single flywheel is fixed to the drive shaft. Multiple additional flywheels are mounted to drive shaft via bearings to allow freewheeling. The fixed (or first) flywheel is fully charged before speed activated clutch engages second flywheel. All additional flywheels are started sequentially in like manner. During discharge, charged flywheels engage drive shaft via one-way ratchet type mechanism and non-charged flywheels continue to freewheel. A sectional drive shaft of one embodiment simplifies portability and assembly. A variable inertia flywheel of another embodiment further reduces charge-up time.

9 Claims, 8 Drawing Sheets

Related U.S. Application Data continuation-in-part of application No. 12/690,397, filed on Jan. 20, 2010, now abandoned.

(51) Int. Cl.
| | | |
|---|---|---|
| *H02K 7/108* | (2006.01) | |
| *F16F 15/30* | (2006.01) | |
| *H02K 16/00* | (2006.01) | |

(52) U.S. Cl.
CPC ....... *Y02E 60/16* (2013.01); *Y10T 403/32041* (2015.01)

(58) Field of Classification Search
USPC ..... 74/572.1, 572.11, 572.12, 572.2, 572.21, 74/573.1, 573.11, 573.12, 573.13, 574.1, 74/574.2, 574.3, 574.4, 575; 192/105 R, 192/103 B, 45.001, 46, 48.3; 310/74, 310/75 R, 78, 92, 112, 114, 153
See application file for complete search history.

(56) References Cited

U.S. PATENT DOCUMENTS

| | | | | |
|---|---|---|---|---|
| 4,688,419 A * | 8/1987 | D'Angelo | ................ | G01L 3/16 |
| | | | | 73/116.06 |
| 4,928,553 A * | 5/1990 | Wagner | ................... | F16H 33/02 |
| | | | | 475/267 |
| 2008/0284257 A1* | 11/2008 | Cope | ..................... | G05G 9/047 |
| | | | | 310/15 |
| 2010/0283340 A1* | 11/2010 | Fradella | ................ | H02K 7/025 |
| | | | | 310/74 |
| 2011/0175370 A1* | 7/2011 | Dugas | ................... | H02K 7/025 |
| | | | | 290/1 R |

\* cited by examiner

FLYWHEEL

This application is a continuation-in-part of U.S. patent application Ser. No. 13/573,889, entitled "Multi-Stack Flywheel Energy Storage Assembly" and filed on Oct. 15, 2012, and a continuation-in-part of U.S. application Ser. No. 12/690,397, entitled "Portable Multi-Stack Flywheel Energy Storage Assembly" and filed on Jan. 20, 2010.

TECHNICAL FIELD

Some implementations relate to flywheel energy storage devices that store energy from any electrical grid or other energy source such as wind turbines and photovoltaic solar power to a flywheel assembly. In particular, some implementations relate to a suspended flywheel assembly having a universal joint to help reduce effects of gyroscopic precession.

BACKGROUND

Flywheels have been used to store energy from power sources for years. Existing flywheel technology consists of a heavy rotating disc that is accelerated to its optimum speed by an electric motor, able to be mechanically driven so as to act as an electric generator. Electricity is stored as kinetic energy in the rotating flywheel. One problem with prior art is the significant amount of time and power required to charge and recharge a heavy flywheel. A second problem associated with prior art is encountered when the heavy flywheel is discharged prior to attaining its optimum operating speed (full charge). Since speed produces a greater proportional influence on total stored energy than weight, a flywheel of one half the weight rotating at twice the speed of another flywheel of the same diameter will store significantly more energy than the heavier flywheel.

More recent prior art attempts to improve charge and recharge time by utilizing much lighter flywheels operating at much higher speeds. To accomplish this, the flywheel is operated in a vacuum and utilizes magnetic bearing and computer stabilization. The higher speeds have presented significant expense and safety issues.

SUMMARY

The Multi-Stack Flywheel Energy Storage Assembly stores energy from various sources including, but not limited to electrical power generating plants, wind turbines and solar power generating systems. Excess generated electrical power is directed to an electric motor that is able to be mechanically driven so as to act as an electric generator (motor/generator). While prior art utilizes one relatively heavy flywheel to accept and store this excess electrical power as kinetic energy, this assembly incorporates multiple flywheels that together have a combined weight equal or greater than the single heavy flywheel it is designed to replace, and allows these multiple flywheels to power up sequentially.

The initial flywheel, closest to the motor/generator is designed to attain its optimum predetermined operating speed before the second flywheel begins to power up. This second flywheel must attain its optimum predetermined operating speed before the third flywheel begins to power up, and so forth. This sequential powering up is accomplished by the combined use of speed activated clutches and roller stops or one-way ratchets. The first flywheel is secured directly to the drive shaft by a collar or other suitable means.

The second and all subsequent flywheels are mounted to the drive shaft via bearings which allow each of these flywheels to spin independent of the drive shaft and of each other. A speed activated clutch comprised of an outer clutch drum part and an internal expanding clutch part is coupled between flywheel number 1 and number 2 so that when flywheel 1 reaches optimum predetermined speed, the first speed activated clutch engages and begins charging flywheel number 2.

A similar clutch between flywheel 2 and 3 activates flywheel number 3 when flywheel number 2 reaches its predetermined speed and so forth until all of the flywheels in the assembly are charged. Except for flywheel 1 which is secured directly to the drive shaft, the remainder of the flywheels are engaged by each speed activated clutch and not by direct coupling to the drive shaft.

When a load is placed on the flywheels (to power the generator) each of the activated flywheels except flywheel 1 (which turns in unison with the drive shaft), will be turning faster than the drive shaft which will automatically cause the one-way roller stops or one-way ratchets to engage and lock on to the drive shaft. Whereby only the activated flywheels will engage the drive shaft allowing the drive shaft to turn unimpeded by the non-activated flywheels that have not been engaged to the drive shaft or previous flywheel by either the speed activated clutch or the one-way roller stop.

This design solves several of the problems identified in the 'prior art' section of this application. The sequential startup of a series of lighter flywheels allows the use of smaller motor/generators, reduces the power input required to activate the flywheel assembly, and/or allows the entire assembly of flywheels to fully activate in less time than required by the conventional heavy flywheel. The discharge problem of a partially charged flywheel is solved because in this assembly, the non-charged flywheels never couple to the drive shaft and thereby present no drag on the drive shaft or the charged flywheels now coupled to the shaft.

A first embodiment may be especially suited to a permanent installation and utilizes a one piece drive shaft. A second embodiment may be especially suited for portability. In this embodiment, the drive shaft is designed to be installed in sections to facilitate ease of assembly in a remote or temporary location because each section can be stacked in place and disassembled and moved to differing locations as needed. A third embodiment can be utilized with either the first or second embodiment but utilizes a variable inertia flywheel in place of every conventional flywheel previously listed in embodiment 1 and 2. These three described embodiments should not be construed as limitations on the scope of the subject matter disclosed herein, but rather as an exemplification of several example embodiments thereof. Accordingly, the scope of the present disclosure should be determined not by the embodiments illustrated.

DETAILED DESCRIPTION

In general, a flywheel based energy storage system which can include one or more flywheels and a motor/generator unit is disclosed. The system can include a universal joint or other similar universal-type joint (e.g., similar to a universal joint sometimes used in vehicles) connecting a suspended flywheel and motor/generator to another body (e.g., a support frame or a mounting point on another structure). The universal joint permits automatic adjustment (e.g., re-alignment) of an axis of the suspended flywheel (e.g., the axis passing through the main drive shaft of the flywheel) to help reduce effects of gyroscopic precession on the flywheel system. The system can include a single flywheel that can be fixed to the drive shaft.

Some implementations can include multiple additional flywheels mounted to the drive shaft via bearings to allow freewheeling. Once the fixed flywheel is fully charged (e.g., rotating at an operational speed) a speed activated clutch can engage a second flywheel and cause the second flywheel to begin rotating. Additional flywheels can be started sequentially in like manner. During discharge, charged flywheels (e.g., those flywheels spinning at an operational speed) can engage the drive shaft via a one-way ratchet type mechanism, while non-charged flywheels may continue to freewheel so as to not hinder the release of energy by the charged flywheel(s).

In some implementations, a sectional drive shaft can help simplify portability and assembly. Some implementations can include one or more variable inertia flywheels to help reduce charge-up time and/or reduce the size of the motor needed to bring the flywheel(s) up to operational speed.

Figure 2:
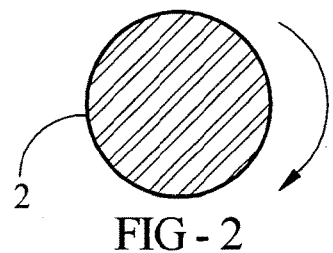
FIG. 2 is a sectional view of the shaft, along line A-A in FIG. 1.
Figure 1:
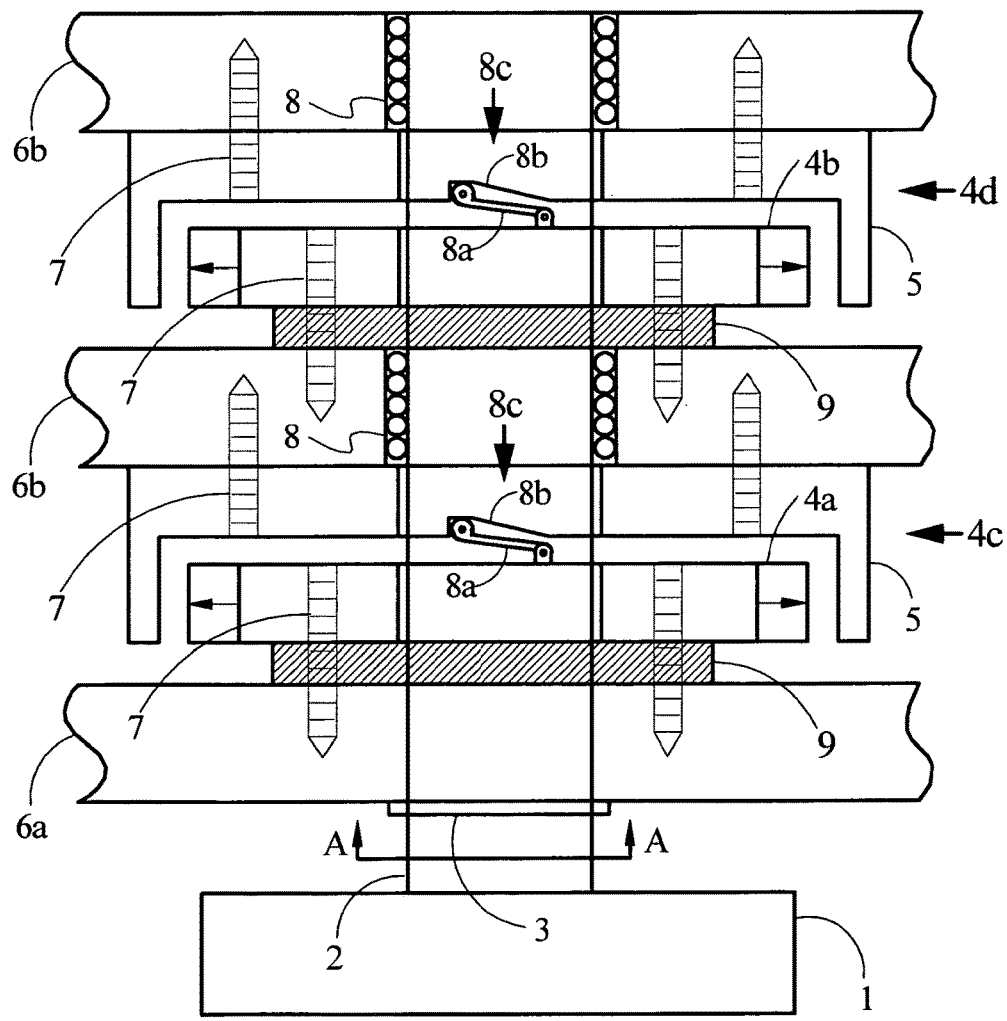
FIG. 1 is a lateral view through the center of the shaft of the assembly for a vertical axis configuration showing the sequencing of the components with a one piece shaft embodiment.

FIG. 1 shows a lateral view of one embodiment of the multi-stack flywheel assembly. This embodiment comprises a motor/generator 1. Said motor/generator is an electric motor, able to be mechanically driven so as to act as an electric generator. A drive shaft 2 extends from said motor/generator 1. A first flywheel 6a is secured to said drive shaft 2 via a coupler 3, or other suitable means of attachment. A first internal expanding clutch part 4a of a speed activated clutch such as a centrifugal clutch or other means set to engage at a predetermined speed, is attached to said first flywheel 6a with a threaded attachment bolts 7 or other suitable means of attachment and separated from said first flywheel 6a by a connecting spacer 9. Attached to the first internal expanding clutch part 4a is a ratchet pawl or a spring loaded roller stop arm 8a (e.g., as described in U.S. Pat. No. 8,413,781 issued to the same inventor as the present application and which is incorporated herein by reference). An outer clutch drum part 5 of said speed activated clutch is attached to a second (and subsequent) flywheel 6b with the threaded attachment bolts 7 or other suitable means of attachment. Said first internal expanding clutch part 4a and said outer clutch drum part 5 comprise a first speed activated clutch assembly 4c.

A bearing 8 allows said second flywheel 6b to rotate freely around said drive shaft 2. A notch or a roller stop seat 8b is positioned in the inner surface of said outer clutch drum part 5 so as to permit free rotation of said second flywheel 6b around said drive shaft 2 in one direction only. Said spring loaded roller stop arm 8a and said roller stop seat 8b comprise a roller stop assembly 8c.

A second (and subsequent) internal expanding clutch part 4b is attached to a second (and subsequent) flywheel 6b with said threaded attachment bolts 7 and separated from said second flywheel 6b by said connecting spacer 9. Attached to said second internal expanding clutch part 4b is said spring loaded roller stop arm 8a. The outer clutch drum 5 of the speed activated clutch is attached to a third (and subsequent) flywheel 6b. Said second and subsequent internal expanding clutch part 4b and said outer clutch drum part 5 comprise a second and all subsequent speed activated clutch assemblies 4d. The remainder of the parts and their connections and relationships can be repeated for any number of additional flywheels being used.

Figure 3:
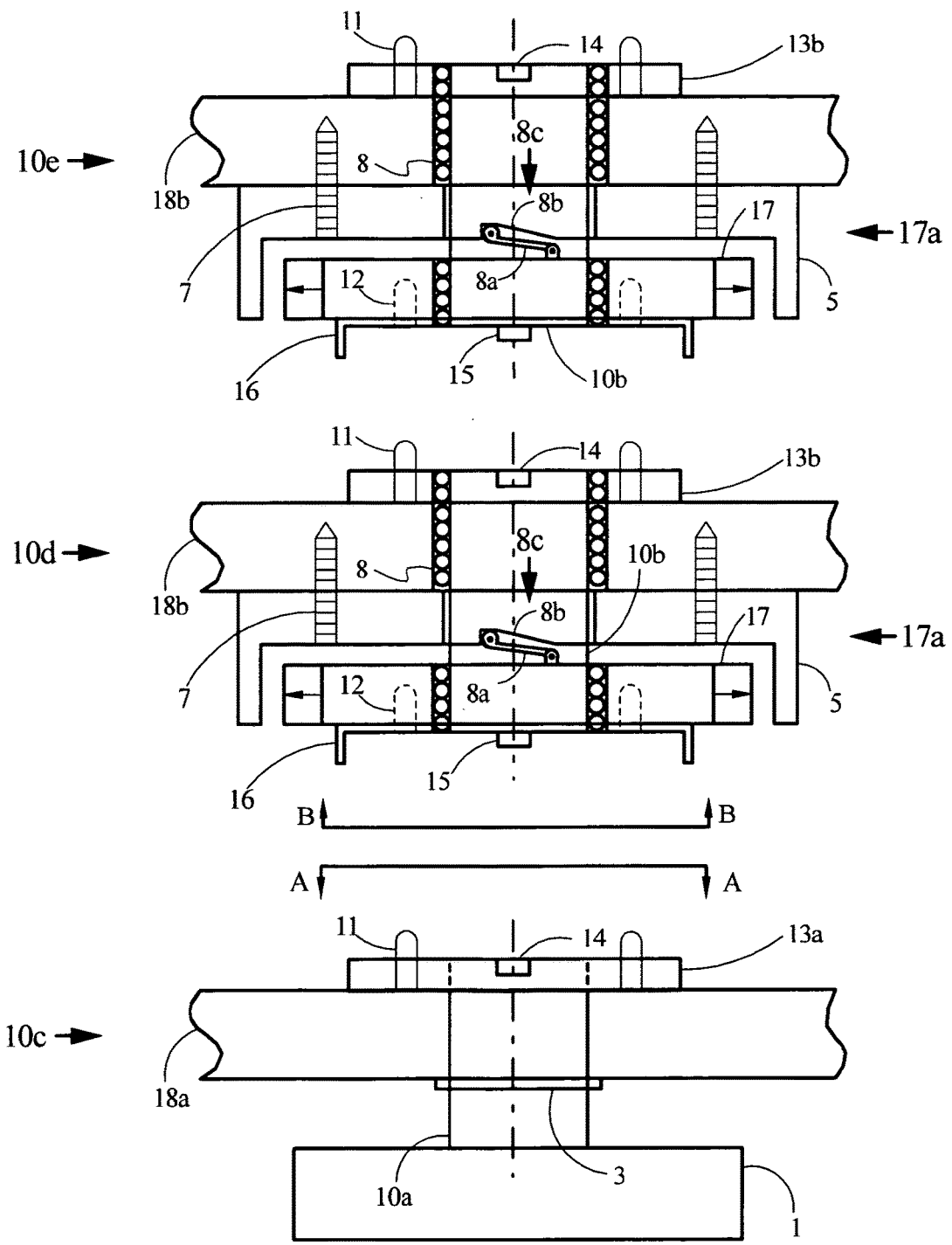
FIG. 3 is a lateral view of the center of a segmented shaft multi-stacked embodiment for a vertical axis configuration showing the sequencing of the components.
Figure 5:
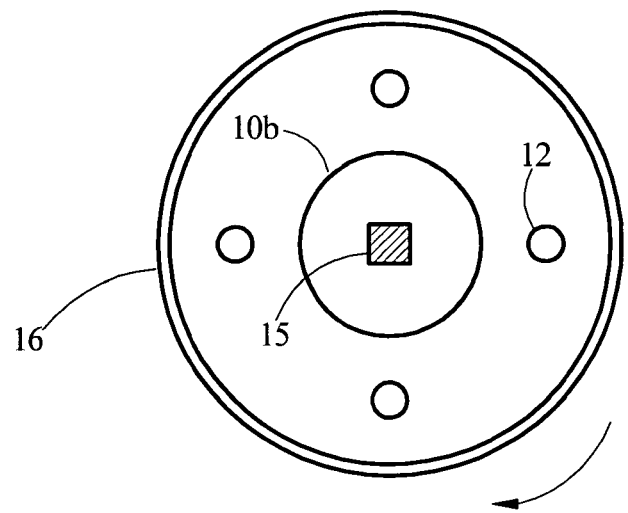
FIGS. 4 and 5 are sectional views along lines A-A and B-B in FIG. 3, respectively, showing the method of attaching the portable stacks of components.
Figure 4:
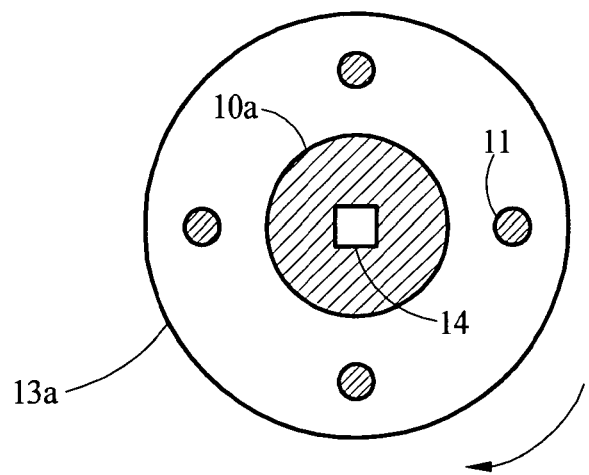

FIG. 3 shows a lateral view of another embodiment of the Multi-Stack Flywheel Assembly. This embodiment exemplifies a Portable Multi-Stack Flywheel Energy Storage Assembly. This embodiment comprises said motor/generator 1. Said motor/generator 1 is an electric motor, able to be mechanically driven so as to act as an electric generator. A first drive shaft section 10a extends from said motor/generator 1. A first flywheel 18a is connected to said first drive shaft section 10a via said coupler 3. A first connecting spacer 13a is attached to said first flywheel 18a and incorporates connector pins 11 and a female notch 14. Said first drive shaft section 10a is coupled with a second (and subsequent) drive shaft section 10b via a male key 15, and an attachment connector 16 and a connector holes 12 or other suitable means of connection, that have been provided in a internal expanding clutch part 17.

A bearing 8 allows said internal expanding clutch part 17 to freewheel around said second and subsequent drive shaft section 10b. Attached to said internal expanding clutch part 17 is said spring loaded roller stop arm 8a. Said outer clutch drum part 5 is attached to a second and subsequent flywheel 18b with said threaded attachment bolts 7 or other suitable means of attachment. Said internal expanding clutch part 17 and said outer clutch drum part 5 comprise a speed activated clutch assembly 17a. Said bearing 8 allows said second flywheel 18b to rotate freely around said second (and subsequent) drive shaft section 10b.

A notch or roller stop seat 8b is positioned in the inner surface of said outer clutch drum 5 allowing free rotation of said second flywheel 18b around said drive shaft section 10b in one direction only. A second (and subsequent) connecting spacer 13b is attached to said second flywheel 18b. The remainder of the parts and their connections and relationships can be repeated for any number of additional flywheels being used.

Another embodiment of the multi-stack flywheel assembly substitutes a variable inertia flywheel 19 in place of all previously listed flywheels. Said variable inertia flywheel (see Pub. No.: US 2011/0277587 A1, which is incorporated herein by reference in its entirety) shortens charge up time compared to conventional solid flywheels.

Operation—First Embodiment

The first embodiment, as illustrated in FIG. 1 is especially suited to a fixed or permanent installation in a power generation facility, a wind farm or a solar collector installation. An electrical power source (not shown) supplies power to an electric motor/generator 1. Said motor/generator is an electric motor, able to be mechanically driven so as to act as an electric generator. A drive shaft 2 extends from said motor/generator 1 as a one piece drive shaft of sufficient length to accommodate a plurality of flywheels. The first flywheel 6a is securely attached to said drive shaft 2 by a collar 3 or other suitable method of attachment so that when power is supplied to said motor/generator 1, said first flywheel 6a and said drive shaft 2 begins to charge or spin. While said drive shaft 2 and said first flywheel 6a continue to accelerate, a second and all subsequent flywheels 6b remain motionless as said drive shaft 2 rotates within each of said flywheels 6b without imparting any energy because said flywheels 6b are mounted on said drive shaft 2 via a bearings 8. An first internal expanding clutch part 4a is attached to said first flywheel 6a via a threaded attachment bolts 7 or other suitable means of attachment, and a connecting spacer 9. Said clutch part 4a is part of a first speed activated clutch assembly 4c coupled into an outer clutch drum 5 (which completes the speed activated clutch assembly). The speed activate clutch assembly can be engaged at a predetermined speed in any suitable manner including but not limited to centrifugal force and electric power. When said first flywheel 6a attains its predetermined optimum operating speed, the speed activated clutch 4c engages said first internal expanding clutch part 4a into said outer clutch drum 5. Said outer clutch drum 5 is attached to a second flywheel 6b via said threaded attachment bolts 7 or any other suitable method of attachment. At this point, said second flywheel 6b begins to spin up or charge. When said second flywheel 6b reaches predetermined optimum speed, a second internal expanding clutch part 4b is activated and engages the next outer clutch drum 5 and so forth until all flywheel 6a, 6b's are rotating at a predetermined operational (or optimum) speed.

During the discharge cycle, electric power is no longer supplied to said motor/generator 1. Now said motor/generator 1 is in generator mode with power being supplied from the stored energy or inertia of the charged or partially charged flywheels. With the exception of said first flywheel 6a which is secured to said drive shaft 2 and therefore spinning at the same speed as said drive shaft 2, all of the remaining charged flywheels 6b are now spinning at a slightly faster speed than said drive shaft 2 as no more power is being supplied to said electric motor 1, and said drive shaft 2 is beginning to slow down.

A spring loaded roller stop arm 8a (acting similar to a pawl of a one-way ratchet) is mounted to the top surface of said first internal expanding clutch part 4a and each of said other internal expanding clutch parts 4b. As said second and all subsequent flywheels 6b over take the speed of said slowing drive shaft 2, said spring loaded roller stop arms 8a engages a roller stop seat 8b that is incorporated into the bottom surface of each of said outer clutch drums 5, securely locking these flywheels 6b to said drive shaft 2. Those flywheels that remained uncharged (not spinning) will not engage said spring loaded roller stop arms 8a to said roller stop seats 8b and will therefore not lock up to said drive shaft 2, and will continue to remain still. Since the charged (spinning) flywheels 6a, 6b will not have to turn the mass of any uncharged flywheels, all of the stored energy (less friction) is available to drive the generator 1.

Operation—Second Embodiment

The second embodiment, as illustrated in FIG. 3 illustrates a first flywheel assembly 10c, a second flywheel assembly 10d and a third flywheel assembly 10e. Additional flywheel assemblies are anticipated to be added as needed, but only these are illustrated for simplicity. Said first flywheel assembly 10c includes a motor/generator 1 which incorporates a first drive shaft section 10a that extends from said motor/generator 1, to a length sufficient to accommodate a first flywheel 18a. Said first flywheel 18a is securely attached to said first drive shaft section 10a via a collar 3 or other suitable method of attachment. When electric power is supplied to said motor/generator 1, said first flywheel 18a begins to charge or spin. Mounted to said first flywheel 18a is a first connecting spacer 13a. Said spacer 13a incorporates a square female notch 14 and a connector pins 11. This completes the operation of said first flywheel assembly 10c.

The second flywheel assembly 10d includes a second drive shaft section 10b that incorporates a square male key 15 on one end that will mate up with said square female notch 14 when said first 10c and said second 10d flywheel assemblies are connected. The other end of said second drive shaft section 10b incorporates a square female notch 14. Said second flywheel assembly 10d also includes an attachment connector 16 attached to the underside of an internal expanding clutch part 17. Said clutch part 17 is mounted on said second drive shaft section 10b via a bearing 8 so that said drive shaft section 10b can rotate independently of said internal clutch part 17. Said internal clutch part 17 also includes connector holes 12 to accommodate connector pins 11 of said first flywheel assembly 10c linking said first flywheel 18a with said internal expanding clutch part 17 when said first flywheel assembly 10c and said second flywheel assembly 10d are connected.

Said internal expanding clutch part 17 rotates within the outer clutch drum part 5 and includes a spring loaded roller stop arm 8a or a ratchet pawl, attached to its top surface. Said outer clutch drum part 5 includes a roller stop seat 8b or suitable notch on its lower surface.

Said outer clutch drum part 5 is attached to a second flywheel 18b via the threaded bolts 7 or other suitable method of attachment. Said second flywheel 18b and attached said outer drum part 5 are mounted on said second drive shaft section 10b via bearings 8 so that said drive shaft section 10b rotates independently of said outer drum 5 and said second flywheel 18b. When said first flywheel 18a attains its predetermined optimum operating speed, said internal expanding clutch part 17 engages said outer clutch drum part 5 causing said second flywheel 18b to begin to rotate.

A second connecting spacer 13b is attached to the top of said second flywheel 18b and incorporates connector pins 11, to facilitate coupling of said second flywheel assembly 10d to a third flywheel assembly 10e.

When said second flywheel 18b reaches predetermined optimum speed, a next internal expanding clutch part 17, as part of said third flywheel assembly 10e, is activated and the process continues to repeat sequentially until all flywheels are fully charged, or generator mode is required.

Said second flywheel assembly 10d is interchangeable with said third flywheel assembly 10e so that as additional assemblies are required, they would include the same parts and operate in an identical manner.

As explained in operation of first embodiment, during the flywheel discharge cycle, as the now connected drive shaft sections 10a and all 10b's begin to slow, the charged flywheels will engage the drive shaft, without drag or interference from any uncharged flywheels, thereby eliminating unnecessary drag from the uncharged flywheels.

Operation—Third Embodiment

The third embodiment substitutes a variable inertia flywheels 19 in place of all flywheels referenced in the first and second embodiment. The Variable Inertia Flywheel (as described in U.S. Pub. No.: US 2011/0277587 A1) anticipates faster spin-up times compared to a conventional flywheel of same weight and diameter, but at full charge, provides an equal amount of energy storage as the conventional flywheel.

The reader will see that with each of these embodiments, a smaller electric motor/generator can be utilized to sequentially power up a plurality of flywheels instead of one large flywheel weighing the same as the total of the multiple flywheels, all flywheels having the same diameter, because the motor is starting a much lighter flywheel which completely powers up before beginning to start the second (lighter flywheel)) and so forth. Additionally, using smaller, less costly motors allows installation of a plurality of complete multi-stack assemblies in place of the one larger conventional unit. This enhances routine maintenance as well as reliability as that one of the assemblies can be taken off line without disturbing any of the remaining assemblies.

The reader will also appreciate that the entire plurality of flywheels in one assembly will reach optimum speed sooner than the one comparable heavy conventional assembly (assuming both have the same motor, same power input and same diameter of flywheels, and same optimum speed).

The design of the embodiments allow the stored inertia of the first fully charged flywheel to assist in the startup of the second flywheel. The first and second fully charged flywheels will assist startup of the third flywheel and so forth, which reduces the total overall power up time as compared to the single heavy conventional unit.

The reader will also appreciate that these embodiments reduce overall bearing friction by spreading an equivalent weight from one heavy flywheel with its one set of bearings to multiple lighter flywheels each with their own set of bearings.

The conventional heavy single flywheel also concentrates the undesirable torque associated with precession into the motor bearings only, while these embodiments spread this torque into multiple sets of bearings during charge up and speed maintaining cycle.

Lighter flywheels are capable of higher operating speeds then their heavier counterparts (of the same diameter) thus allowing these embodiments to operate at speeds higher than the single heavy component. Since speed has a greater than proportional influence on total stored energy than weight, these embodiments provide for a more than proportional increase in total stored energy. For example, A 2% increase in speed produces a nearly 4% increase in energy stored.

When stored power is needed prior to the flywheels reaching optimum speed, these embodiments provide more retrievable energy than the single heavy flywheel. Best described as an example, the reader is asked to compare a multi-stack assembly of 10 one hundred pound flywheels to a single one thousand pound flywheel. Both systems utilize identical motors, same diameter flywheels, same energy input and same optimum speed. Assume both take 10 minutes to run up from zero to full charge. At the half way point (5 minutes), 5 of the 10 multi-stack flywheels are fully charged and the remaining 5 are at zero speed (charge) while the single heavy flywheel is at or below half speed. For the multi-stack, during the discharge cycle, only the charged flywheels engage (lock on to) the drive shaft to supply power to the generator while the uncharged flywheels do not lock up with the drive shaft and remain motionless creating no drag on the energy being supplied back to the generator.

Continuing with the same example, and understanding that an increase in speed has a disproportionately higher effect on the amount of energy stored than does an increase in weight, the reader can appreciate another advantage over the single lager unit. Five 100 pound flywheels locked to a single drive shaft and spinning at full speed represent a greater amount of stored energy than does a one thousand pound flywheel at half speed.

The Third embodiment incorporates a variable inertia flywheel that by design allows the flywheel to spin up faster than a conventional solid flywheel of equal weight and diameter. (See Pub. No.: US 2011/0277587 A1).

FIGS. 6-10 show diagrams of suspended flywheel systems with a universal joint to help reduce effects of gyroscopic precession. Before describing the details of the example flywheel systems shown in FIGS. 6-10, it may be helpful to explain the general operational principles of the suspended flywheel systems with a universal joint.

Rotating bodies experience an effect called gyroscopic precession when a forces acts to tilt the axis of rotation of the rotating body. Gyroscopic precession results in a force attempting to tilt the axis of rotation taking affect 90 degrees from where the force was applied. A flywheel operating in Earth's gravity field is essentially a rotating body (the flywheel) traveling on another rotating body (the Earth). Rotating objects on the Earth (or within the Earth's gravitational field) may experience precession due to a force related to the movement of the Earth or a force associated with movement of the flywheel (e.g., movement of a vehicle or other structure in which the flywheel is mounted). In general, whether on the Earth or in another environment, a flywheel may experience precession when any force acts to tilt the axis of rotation of the flywheel.

In the case of flywheels that are in a fixed position, this precession may cause a force to be exerted on the flywheel and may cause one or more inefficiencies such as additional drag, friction, and/or wear. One way of minimizing the effect of precession is to place a rotating object in a frame that can rotate about one or more axes (e.g., a gimbal). The universal joint feature of some implementations described herein can help reduce unwanted effects of precession.

The example embodiments shown in FIGS. 6-9 where conceived in light of the above-mentioned problems and limitations, among other things. In some implementations, a flywheel system can be suspended, that is a proximate end of the flywheel system is attached or mounted to a support frame or other structure and a distal end extends below the proximate end in a direction generally in line with the gravitational force of the Earth. In between the mounting point and the flywheels, the system can include a joint that permits the axis of rotation of the flywheel to move. The joint can be a double gimbal joint (or universal joint or universal-type joint) or a single gimbal joint. The universal joint would permit the system to be installed without taking into account the orientation of the Earth's gravity field at the installation location. However, the single gimbal joint may require that the orientation of the Earth's gravity field be taken into account when installing the flywheel system in order to accommodate the restricted freedom of movement.

The universal joint can be attached to a mounting point of the flywheel system and to the motor/generator (or a frame supporting the motor/generator) in such a way that the universal joint does not rotate with respect to either the mounting point or the motor/generator. In this way, the universal joint can provide freedom of movement for the rotational axis of the flywheel to adjust based on any precession effects, but not permit the flywheel system itself to rotate about the axis of flywheel rotation. By not permitting rotation, the need for connections that accommodate rotation can be eliminated. The suspended flywheel system with universal joint described below can automatically adjust its axis of rotation in a way that is similar to the way the swing plane of a Foucault pendulum appears to move in response to the rotation of the Earth, except the flywheel system is not "swinging" in the way the pendulum swings, but rather slowly adjusting the alignment of the axis of rotation of the flywheel system to stay generally in line with the axis of Earth's rotation.

Figure 6:
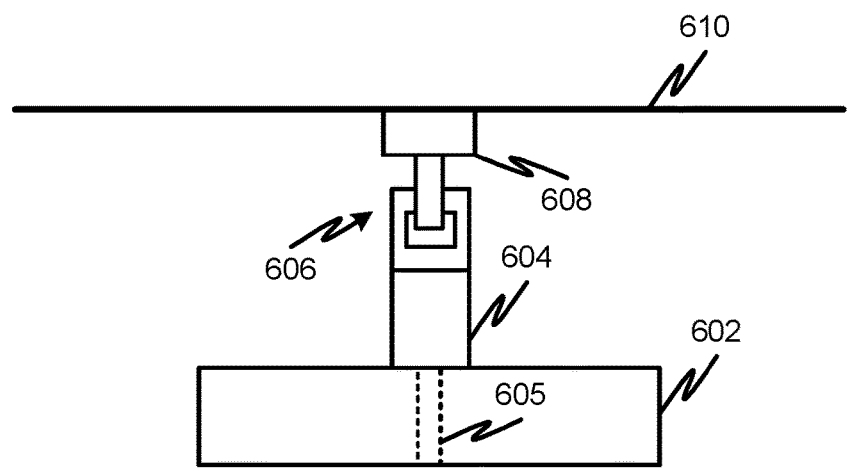
FIG. 6 is a diagram of a suspended flywheel having a single flywheel and a universal joint to reduce effects of precession in accordance with at least one embodiment.

FIG. 6 is a diagram of a suspended flywheel having a single flywheel 602 coupled to a motor/generator 604. A first end of the motor/generator 604 is attached to first side of a universal joint 606 and a drive shaft 605 (e.g., similar to drive shaft 2 shown in FIG. 1) extends from the second end of the motor/generator 604 in a generally downward direction. A second side of the universal joint 606 is attached to a mounting plate 608. The mounting plate can be attached to a structure 610 (e.g., a support beam, frame member, ceiling joist, or other suitable structure). As described above, the universal joint 606 permits the flywheel 602 to move and automatically adjust its axis of rotation in response to the rotation of the Earth and thereby help reduce or eliminate effects of gyroscopic precession on the flywheel 602. The motor/generator 604 can be connected to a power source via flexible electrical cabling that is constructed to accommodate the movement of the flywheel 602 through at least a portion of the range of motion provided by the universal joint 606.

Figure 7:
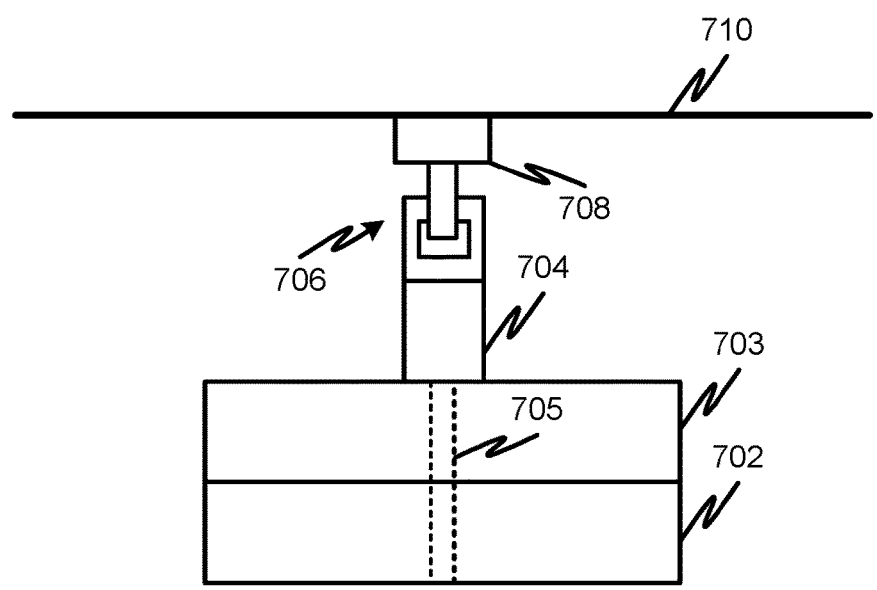
FIG. 7 is a diagram of a suspended multi-stack flywheel having a universal joint to reduce effects of precession in accordance with at least one embodiment.

FIG. 7 is a diagram is a diagram of a suspended multi-stack flywheel having a plurality of flywheels (702, 703) coupled to a motor/generator 704. A first end of the motor/generator 704 is attached to first side of a universal joint 706 and a drive shaft 705 (e.g., similar to drive shaft 2 shown in FIG. 1) extends from the second end of the motor/generator 604 in a generally downward direction. A second side of the universal joint 706 is attached to a mounting plate 708. The mounting plate can be attached to a structure 710 (e.g., a support beam, frame member, ceiling joist, or other suitable structure). As described above, the universal joint 706 permits the flywheels 702/703 to move and automatically adjust the axis of rotation in response to the rotation of the Earth and thereby help reduce or eliminate effects of gyroscopic precession on the flywheels 702/703. The motor/generator 704 can be connected to a power source via flexible electrical cabling that is constructed to accommodate the movement of the flywheel 702 through at least a portion of the range of motion provided by the universal joint 706.

Figure 8:
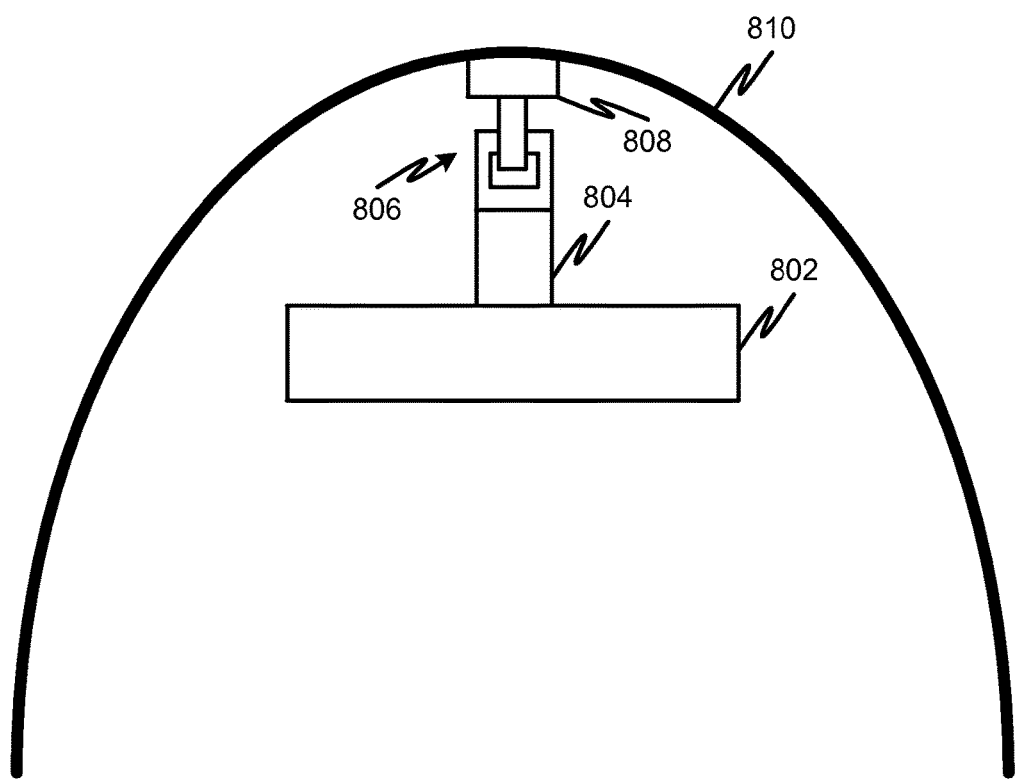
FIG. 8 is a diagram of a suspended flywheel having a single flywheel and a frame and a universal joint to reduce effects of precession in accordance with at least one embodiment.
Figure 9:
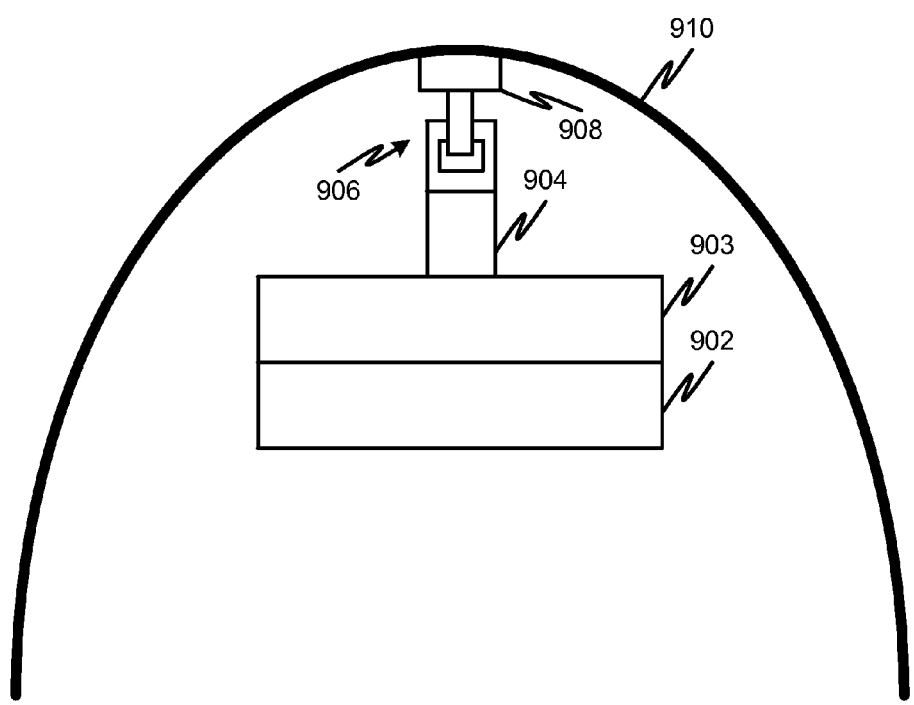
FIG. 9 is a diagram of a suspended multi-stack flywheel having a frame and a universal joint to reduce effects of precession in accordance with at least one embodiment.

FIG. 8 is a diagram of a suspended flywheel having a single flywheel 802 coupled to a motor/generator 804. The motor/generator 804 is attached to first side of a universal joint 806. A second side of the universal joint 806 is attached to a mounting plate 808. The mounting plate can be attached to a support frame structure 810 (e.g., a support frame having a plurality of frame members defining an interior space in which the flywheel system is disposed). The support frame can include arcuate members (as shown in FIGS. 8-9), rectangular members or members having any suitable geometry for supporting a flywheel system. The support frame can be formed from any suitable material (e.g., steel, aluminum, carbon fiber, etc.). The support frame structure 810 can include multiple individual members that can be transported relatively easily and assembled into the support frame (e.g., similar to a portable tent framework). As described above, the universal joint 806 permits the flywheel 802 to move and automatically adjust its axis of rotation in response to the rotation of the Earth and thereby help reduce or eliminate effects of gyroscopic precession on the flywheel 802. The motor/generator 804 can be connected to a power source via flexible electrical cabling that is constructed to accommodate the movement of the flywheel 802 through at least a portion of the range of motion provided by the universal joint 806.

FIG. 9 is a diagram of a suspended flywheel having a plurality of flywheels 902/903 coupled to a motor/generator 904. The motor/generator 904 is attached to first side of a universal joint 906. A second side of the universal joint 906 is attached to a mounting plate 908. The mounting plate 908 can be attached to a support frame structure 910 (e.g., a support frame having a plurality of frame members defining an interior space in which the flywheel system is disposed). The support frame 910 can include arcuate members (as shown in FIGS. 8-9), rectangular members or members having any suitable geometry for supporting a flywheel system. The support frame 910 can be formed from any suitable material (e.g., steel, aluminum, carbon fiber, etc.). The support frame 910 can include multiple individual members that can be transported relatively easily and assembled into the support frame 910 (e.g., similar to a portable tent framework). As described above, the universal joint 906 permits the flywheels 902/903 to move and automatically adjust an axis of rotation in response to the rotation of the Earth and thereby help reduce or eliminate effects of gyroscopic precession on the flywheels 902/903. The motor/generator 904 can be connected to a power source via flexible electrical cabling that is constructed to accommodate the movement of the flywheels 902/903 through at least a portion of the range of motion provided by the universal joint 906.

Figure 10:
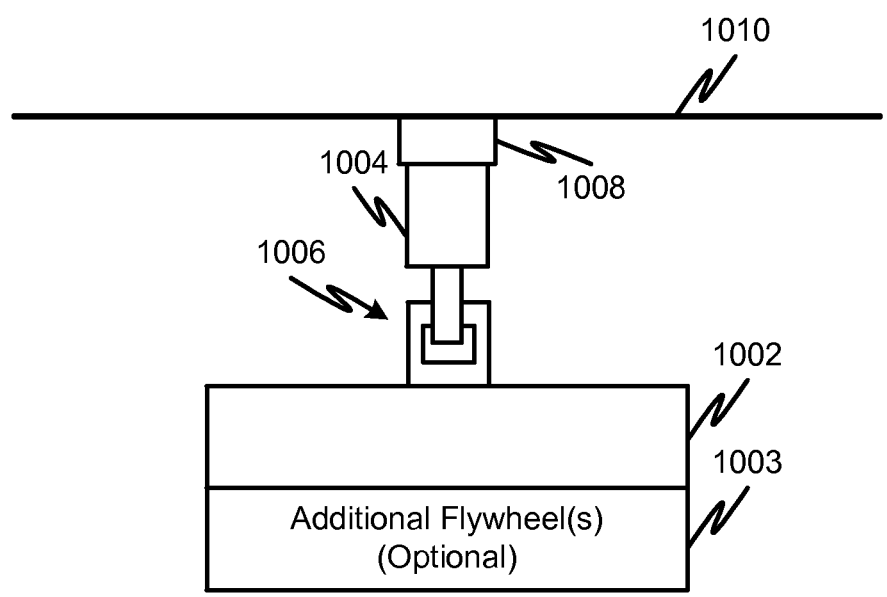
FIG. 10 is a diagram of a suspended flywheel having a single flywheel (or multiple flywheels) and a universal joint to reduce effects of precession, where the universal joint is disposed between the motor/generator and the flywheel(s) in accordance with at least one embodiment.

FIG. 10 is a diagram of a suspended flywheel having one or more flywheels 1002/1003 coupled to a universal joint 1006, which is in turn coupled to a motor/generator 1004. The motor/generator 1004 is attached to first side of the universal joint 1006 and to a mounting plate 1008. A second side of the universal joint 606 is attached to an adjacent flywheel 1002. The mounting plate can be attached to a structure 1010 (e.g., a support beam, frame member, ceiling joist, or other suitable structure). As described above, the universal joint 1006 permits the flywheel(s) 1002/1003 to move and automatically adjust its axis of rotation in response to the rotation of the Earth (or in response to other movement) and thereby help reduce or eliminate effects of gyroscopic precession on the flywheel(s) 1002/1003. The motor/generator 1004 can be connected to a power source via flexible electrical cabling that is constructed to accommodate the movement of the flywheel(s) 1002/1003 through at least a portion of the range of motion provided by the universal joint 1006.

It will be appreciated that one or more flywheels can be used with the embodiments described above in conjunction with FIGS. 6-10. It will also be appreciated that the universal joint shown in FIGS. 6-10 may be used with the other embodiments described herein. Also, it will be appreciated that FIGS. 6-10 are simplified diagrams for purposes of illustrating key features. Standard elements, such as mounting frames, connecting members, cabling and wiring harnesses and the like have not been shown so that the diagrams more clearly convey key features.

While the above description contains many specifics used as examples, these should not be construed as limitations on the scope of the disclosed subject matter, but rather as an exemplification of one or several example embodiments thereof. Many other variations are possible. Accordingly, the scope of the disclosed subject matter should not be limited to the embodiments illustrated and described herein.

DRAWINGS—PARTS LIST

| Ref. No. | Description | Embodiment |
|---|---|---|
| 1 | motor/generator | 1, 2, 3 |
| 2 | drive shaft | 1, 3 |
| 3 | collar | 1, 2, 3 |
| 4A | first internal expanding clutch part | 1, 3 |
| 4B | second and all subsequent internal expanding clutch part | 1, 3 |
| 4C | first speed activated clutch assembly | 1, 3 |
| 4D | second and all subsequent speed activated clutch assemblies | 1, 3 |
| 5 | outer clutch drum part | 1, 2, 3 |
| 6A | first flywheel | 1, 3 |
| 6B | second and all subsequent flywheels | 1, 3 |
| 7 | threaded attachment bolt | 1, 2, 3 |
| 8 | bearings | 1, 2, 3 |
| 8A | spring loaded roller stop arm | 1, 2, 3 |
| 8B | roller stop seat | 1, 2, 3 |
| 8C | roller stop assembly | 1, 2, 3 |
| 9 | connecting spacer | 1, 3 |
| 10A | first drive shaft section | 2, 3 |
| 10B | second and all subsequent drive shaft sections | 2, 3 |
| 10C | first flywheel assembly | 2, 3 |
| 10D | second flywheel assembly | 2, 3 |
| 10E | third flywheel assembly | 2, 3 |
| 11 | connector pin | 2, 3 |
| 12 | connector hole | 2, 3 |
| 13A | first connecting spacer | 2, 3 |
| 13B | second and all subsequent connecting spacers | 2, 3 |
| 14 | square female notch | 2, 3 |
| 15 | square male key | 2, 3 |
| 16 | attachment connector | 2, 3 |
| 17 | internal expanding clutch part | 2, 3 |
| 17A | speed activated clutch assembly | 2, 3 |
| 18A | first flywheel | 2, 3 |
| 18B | second and all subsequent flywheels | 2, 3 |
| 19 | variable inertia flywheels | 3 |
| 602 | flywheel | any |
| 604 | motor/generator | any |
| 606 | universal joint | any |
| 608 | mounting plate | any |
| 610 | structure | any |
| 702 | flywheel | any |
| 703 | flywheel | any |
| 704 | motor/generator | any |
| 706 | universal joint | any |
| 708 | mounting plate | any |
| 710 | structure | any |
| 802 | flywheel | any |
| 804 | motor/generator | any |
| 806 | universal joint | any |
| 808 | mounting plate | any |
| 810 | support frame structure | any |
| 902 | flywheel | any |
| 903 | flywheel | any |
| 904 | motor/generator | any |
| 906 | universal joint | any |
| 908 | mounting plate | any |
| 910 | support frame structure | any |
| 1002 | flywheel | any |
| 1003 | flywheel | any |

-continued

| Ref. No. | Description | Embodiment |
|---|---|---|
| 1004 | motor/generator | any |
| 1006 | universal joint | any |
| 1008 | mounting plate | any |
| 1010 | structure | any |

What is claimed is:

1. A flywheel energy storage assembly comprising:
a universal joint having a first portion and a second portion, the first portion being joined to a mounting member at a top of the flywheel energy storage assembly, the universal joint extending in a generally downward direction away from the top of the flywheel energy storage assembly;
a motor/generator able to function as an electric motor and also able to be mechanically driven so as to act as an electric generator, the motor/generator being disposed below the universal joint, the motor/generator having a first end and a second end, the first end of the motor/generator being joined to the second portion of the universal joint;
a drive shaft extending from the second end of the motor/generator in a generally downward direction away from the top of the flywheel energy storage assembly; and
a plurality of flywheels disposed below the motor/generator, with at least one flywheel of the plurality of flywheels mechanically coupled to the drive shaft,
wherein the plurality of flywheels include a first flywheel and a second flywheel, wherein the first flywheel is mechanically coupled to the drive shaft, and wherein the second flywheel includes a speed activated clutch assembly constructed to engage the second flywheel when the first flywheel reaches a given rotational speed and to freewheel when the first flywheel is below the given rotational speed, and
wherein the flywheel energy storage assembly further comprises a plurality of roller stop assemblies configured to provide for simultaneous discharge of any charged flywheels rotating at the given speed when a drive shaft rotational speed falls below the given rotational speed of the charged flywheels.

2. The flywheel energy storage assembly of claim 1, further comprising:
a support frame having a plurality of members each spaced apart and being joined to form a top of the support frame near a top of the flywheel energy storage assembly to define an interior space generally below the top of the support frame,
wherein the mounting member is attached to the support frame, and
wherein the universal joint, the motor/generator, the drive shaft and the plurality of flywheels are disposed within the interior space defined by the support frame.

3. The flywheel energy storage assembly of claim 1, further comprising a third flywheel and an additional speed activated clutch disposed between the second flywheel and the third flywheel, the additional speed activated clutch being configured to the third flywheel to freewheel until the second flywheel reaches the given rotational speed, wherein when the second flywheel reaches the given rotational speed, the additional speed activated clutch engages the third flywheel and causes it to begin rotating such that the plurality of flywheels are engaged one at a time in sequence once a preceding flywheel has reached the given rotational speed.

4. The flywheel energy storage assembly of claim 1, wherein at least one of the plurality of flywheels is a variable inertia flywheel.

5. A flywheel energy storage assembly comprising:
- a motor/generator able to function as an electric motor and also able to be mechanically driven so as to act as an electric generator, the motor/generator having a first end and a second end, the first end joined to a mounting member at a top of the flywheel energy storage assembly;
- a drive shaft extending from the second end of the motor/generator in a generally downward direction away from the top of the flywheel energy storage assembly;
- a universal joint having a first portion and a second portion, the first portion being connected to the drive shaft, the universal joint extending in a generally downward direction away from the top of the flywheel energy storage assembly;
- a plurality of flywheels disposed below the motor/generator, with at least one flywheel mechanically coupled to the second portion of the universal joint; and
- wherein the plurality of flywheels include a first flywheel and a second flywheel, wherein the first flywheel is mechanically coupled to the drive shaft, and wherein the second flywheel includes a speed activated clutch assembly constructed to engage the second flywheel when the first flywheel reaches a given rotational speed and to freewheel when the first flywheel is below the given rotational speed, and
- wherein the flywheel energy storage assembly further comprises a plurality of roller stop assemblies configured to provide for simultaneous discharge of any charged flywheels rotating at the given rotational speed when a drive shaft rotational speed falls below the given rotational speed of the charged flywheels.

6. The flywheel energy storage assembly of claim 5, further comprising:
- a support frame having a plurality of members each spaced apart and being joined to form a top of the support frame near a top of the flywheel energy storage assembly to define an interior space generally below the top of the support frame,
- wherein the mounting member is attached to the support frame, and
- wherein the universal joint, the motor/generator, the drive shaft and the plurality of flywheels are disposed within the interior space defined by the support frame.

7. The flywheel energy storage assembly of claim 5, further comprising a third flywheel and an additional speed activated clutch disposed between the second flywheel and the third flywheel, the additional speed activated clutch being configured to the third flywheel to freewheel until the second flywheel reaches the given rotational speed, wherein when the second flywheel reaches the given rotational speed, the additional speed activated clutch engages the third flywheel and causes it to begin rotating such that the plurality of flywheels are engaged one at a time in sequence once a preceding flywheel has reached the given rotational speed.

8. The flywheel energy storage assembly of claim 5, wherein at least one of the plurality of flywheels is a variable inertia flywheel.

9. A flywheel energy storage assembly comprising:
- a motor/generator able to function as an electric motor and also able to be mechanically driven so as to act as an electric generator, the motor/generator having a first end and a second end, the first end joined to a mounting member of the flywheel energy storage assembly;
- a drive shaft extending from the second end of the motor/generator;
- a plurality of flywheels coupled to the drive shaft, wherein the plurality of flywheels includes a first flywheel and a second flywheel, wherein the first flywheel is mechanically coupled to the drive shaft, and wherein the second flywheel includes a speed activated clutch assembly constructed to engage the second flywheel when the first flywheel reaches a given rotational speed and to freewheel when the first flywheel is below the given rotational speed; and
- a roller stop assembly corresponding to the second flywheel and configured to engage the second flywheel when the second flywheel is rotating at a speed faster than a speed of said drive shaft.

* * * * *